United States Patent [19]
Bull et al.

[11] 3,958,649
[45] May 25, 1976

[54] METHODS AND MECHANISMS FOR DRILLING TRANSVERSELY IN A WELL

[75] Inventors: George H. Bull, Houston, Tex.; Paul D. Bull, Charlottesville, Va.; James E. Cunningham, Houston, Tex.

[73] Assignees: George H. Bull; James E. Cunningham, both of Houston, Tex. ; part interest to each

[22] Filed: July 17, 1975

[21] Appl. No.: 596,596

Related U.S. Application Data

[63] Substitute for Ser. No. 706,743, Feb. 5, 1968, abandoned.

[52] U.S. Cl. .................................. 175/61; 64/2 P; 175/82; 285/118; 285/223
[51] Int. Cl.[2] .......................................... E21B 7/08
[58] Field of Search .................. 175/61, 77, 78, 79, 175/80, 81, 82, 83, 256; 61/2 R, 2 P, 23; 285/118, 223

[56] References Cited
UNITED STATES PATENTS

| | | | |
|---|---|---|---|
| 860,013 | 6/1907 | Church | 64/2 P |
| 2,296,161 | 9/1942 | Hall | 175/82 X |
| 2,390,646 | 12/1945 | Hays | 175/79 X |
| 2,441,881 | 5/1948 | Hays | 175/78 X |
| 2,516,383 | 7/1950 | Hays | 175/79 |
| 2,895,314 | 7/1959 | Helm | 64/2 P X |
| 3,446,297 | 5/1969 | Cullen et al. | 64/2 R X |

Primary Examiner—Ernest R. Purser
Assistant Examiner—Richard E. Favreau
Attorney, Agent, or Firm—Theron H. Nichols

[57] ABSTRACT

Two methods and four mechanisms are disclosed for drilling at right angles to a vertical well at any location or depth in the well. The drilling mechanisms each comprises a flexible spring biased telescopic fluid conduit having a turbodrill on the lower end thereof for extending from an opening in the side of an elongated cylindrical housing for drilling at right angles to the well. The flexible spring biased telescopic fluid conduit comprises a plurality of axially aligned spools with cylinders interconnecting the adjacent ends of adjacent spools and with a compression spring in each cylinder between the two adjacent spool ends for permitting flexibility and telescopic action of the fluid conduit while resisting high compression and torque loads. Rubber-like rings and serrations increase the friction between the telescopic spools and cylinders, and tongue-and-groove splines between the flexible spring biased telescopic fluid conduit and the elongated cylindrical housing increase friction for receiving torque loads in the right angled drilling mechanism. A method for drilling in a transverse direction from a vertical well and a method for forming and assembling a drilling mechanism for drilling at right angles to a vertical well in a well are disclosed.

15 Claims, 7 Drawing Figures

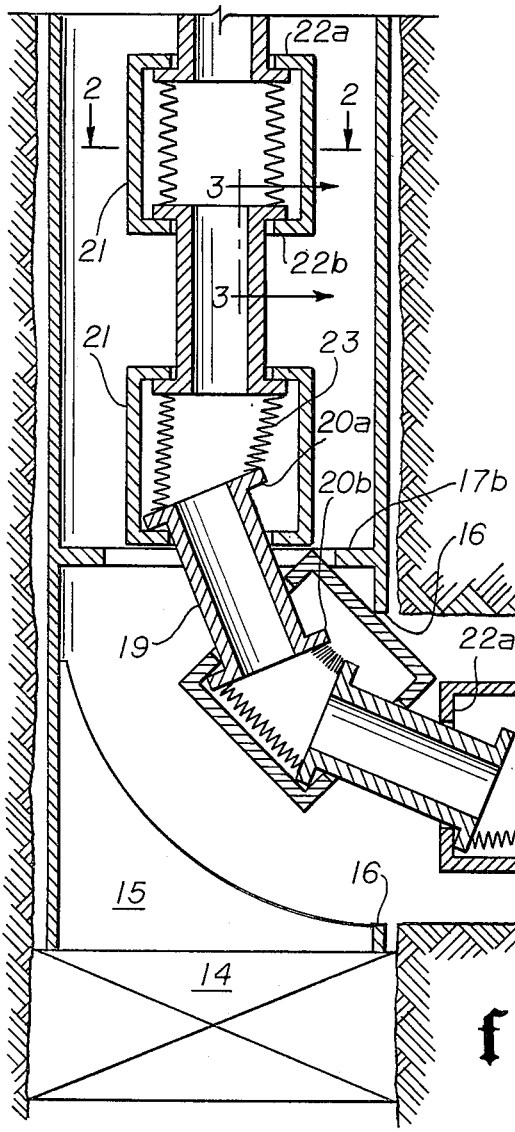
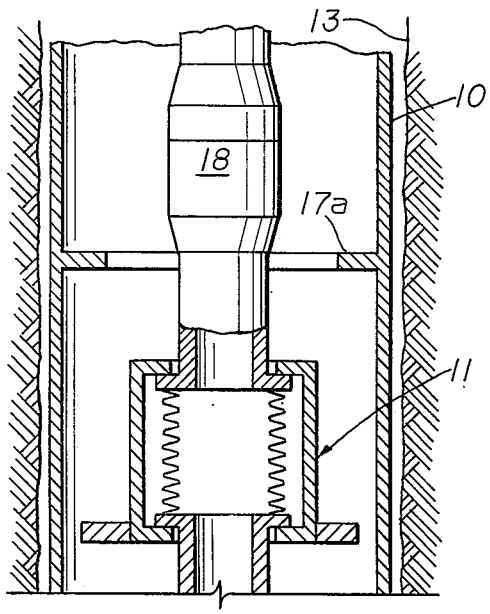
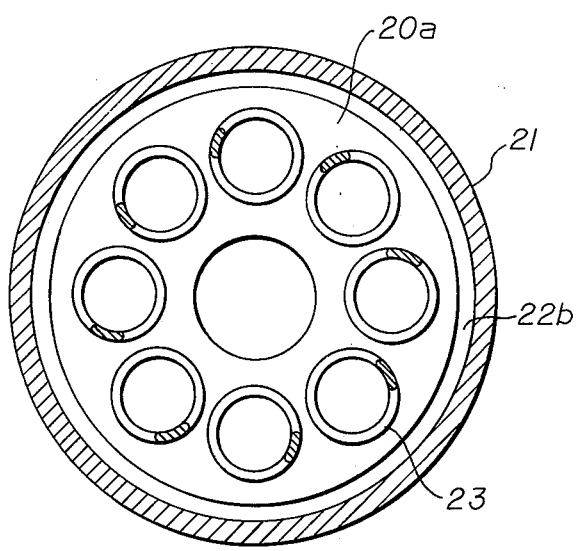
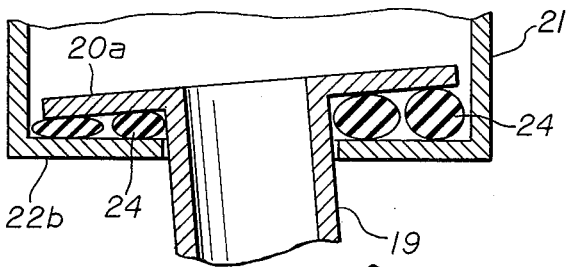
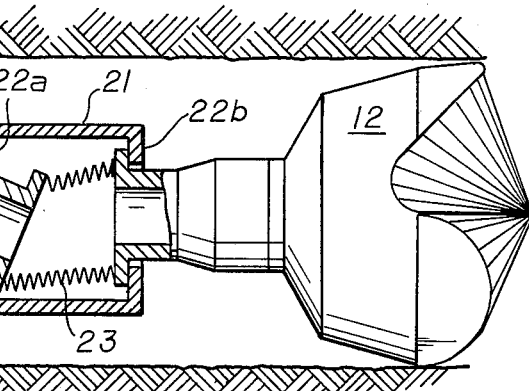
fig.1
fig.2
fig.3

METHODS AND MECHANISMS FOR DRILLING TRANSVERSELY IN A WELL

This is a Substitute for our application filed Feb. 5, 1968, Ser. No. 706,743, now abandoned.

BACKGROUND OF THE INVENTION

Many problems have been encountered in attempting to drill at right angles to a vertical well. One problem has been to drill exactly at right angles to the well without making a large radius curve as is illustrated in U.S. Pat. No. 2,709,070. As seen herein, no positive guide means is provided for assuring that the drill bit is eventually pointed normal and perpendicular to the vertical well nor can it be determined what the turning radius will be and when and where the drill bit will be drilling horizontally and at right angles to the vertical well. Others have tried drilling transversely of the well, but have not succeeded in designing a drill strong enough to drill under high pressure for any length of time as shown in U.S. Pat. Nos. 2,521,976; 2,595,018; and 2,608,384. None of these can be placed under varying loads of high compressive or vertical forces and have the flexible conduit telescopic and contract under high loads to expand as the loads decrease to provide a steady smooth transmission of compressive forces to the drill bit without buckling as would occur in any of the above patents, and yet resist torque loads as a rotating force is generated by the rotating drill bit.

OBJECTS OF THE INVENTION

Accordingly, a principal object of this invention is to provide a method for drilling transversely with a compressible and telescopic hydraulic fluid drill pipe conduit.

Another pricnipal object of this invention is to provide a method for forming and assembling a transverse drilling mechanism.

A further object of this invention is to provide a right angled drilling apparatus for drilling transversely to a vertical well at any desired depth having a flexible spring biased telescopic fluid conduit for operating a turbodrill.

A still further object of this invention is to provide a mechanism for drilling at right angles to a vertical well that is easy to operate, is of simple configuration, is economical to build and assemble, and is of greater efficiency for horizontal drilling of a well normal to a vertical well.

Other objects and various advantages of the disclosed method for drilling transversely to a vertical well, method for forming and assembling a transverse drilling mechanism, and a right angled drilling apparatus will be apparent from the following detailed description, together with the accompanying drawings, submitted for purposes of illustration only and not intended to define the scope of the invention, reference being had for that purpose to the subjoined claims.

DESCRIPTION OF THE INVENTION

The invention disclosed herein, the scope of which being defined in the appended claims, is not limited in its application to the details of construction and arrangement of parts shown and described for carrying out the disclosed methods, since the invention is capable of other embodiments for carrying out other methods and of being practiced or carried out in various other ways. Also, it is to be understood that the phraseology or terminology employed herein is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

DESCRIPTION OF THE METHODS

This invention comprises a method for drilling transversely to a vertical well, a method for forming and assembling a transverse drilling apparatus, and a few mechanisms for practicing the methods.

METHOD OF DRILLING TRANSVERSELY

A method for drilling in a transverse direction from a vertical well with a turbodrill means comprising the steps of, 1. lowering in the well to the desired depth an elongated cylindrical housing having a transverse opening adjacent the bottom thereof and an opening in the top thereof, 2. positioning a compressible and telescopic hydraulic fluid conduit of axially aligned spools interconnected with a cylindrical spring biasing means in the elongated cylindrical housing, 3. supplying a high pressure hydraulic drilling fluid through a drill pipe string to the top of the compressible and telescopic hydraulic fluid conduit in the elongated cylindrical housing for operating the turbodrill means at the bottom thereof, 4. extending the lower end of the compressible and telescopic hydraulic fluid conduit with the turbodrill means on the end thereof down into the elongated cylindrical housing, and 5. extending said compressible and telescopic hydraulic fluid conduit lower end with the turbodrill means thereon out from the transverse opening in the elongated cylindrical housing for drilling transversely of the well at the desired depth under high compressive and torque loads.

A variation of the above method may be utilized. This comprises a method for drilling in a horizontal direction transversely from a vertical well with a turbodrill on the end of a compressible telescopic hydraulic fluid conduit extendible into the top of an elongated cylincrical housing having a transverse opening adjacent the bottom thereof supplied with a drill pipe string from the surface comprising the method steps of, 1. lowering the elongated cylindrical housing to the desired depth in the well with the compressible telescopic hydraulic fluid conduit and turbodrill thereon, 2. applying a downward force to the compressible telescopic hydraulic fluid conduit for passing it through the elongated cylindrical housing and projecting the turbodrill from the elongated cylindrical housing transverse opening, 3. simultaneously operating the turbodrill with hydraulic fluid from the compressible telescopic hydraulic fluid conduit and the drill pipe string for drilling transversely of the vertical wall, and 4. telescoping the compressible telescopic hydraulic fluid conduit as it turns at right angles in the elongated cylindrical housing for drilling at right angles to the vertical well at the desired depth.

METHOD OF FORMING AND ASSEMBLING A DRILLING MECHANISM

A method for forming and assembling a drilling mechanism for drilling at right angles to a vertical well comprises the steps of, 1. closing the bottom of a cylindrical housing with an arcuate guide piece,
2. forming an opening in the side of the cylindrical housing at the bottom in line transversely with the guide piece,
3. forming a plurality of spools in axial alignment, the end of each spool having a radially outwardly extending flange,
4. interconnecting the contiguous ends of adjacent spools with cylinders, the end of each cylinder having a radially inwardly extending flange for overlapping a spool radially outwardly extending flange,
5. mounting a plurality of compression springs between the two opposit flanged spool ends in each cylinder for spring biasing the conduit of alternating cylinders and spools to a straight fully extended conduit for forming a compressible telescopic hydraulic fluid conduit, and
6. connecting a high pressure hydraulic drilling fluid drill pipe string to the upper end of the compressible telescopic hydraulic fluid conduit and connecting a turbodrill means to the lower end of the compressible telescopic hydraulic fluid conduit so that the turbodrill means will extend transversely from the cylindrical housing side opening as guided by the arcuate guide piece Additional method steps and/or variations comprise the following method steps:

1. forming a frictional surface between each pair of contiguous flange surfaces on the adjacent ends of each pair of adjacent spool and cylinder whereby the conduit will withstand high torque forces without buckeling and bending resulting from the reaction of the turbodrill means and the high axial loads generated by the downward forces of the high pressure hydraulic drilling fluid drill pipe string whereby the arcuate guide piece causes the conduit to turn and drill at right angles to the well as the turbodrill means is extended further through the side opening in the cylincrical housing by downward movement of the high pressure hydraulic drilling fluid tubing string.
2. positioning at least one rubber-like ring between each pair of adjacent spool and cylinder flange surfaces.
3. forming serrations on the contiguous surfaces of each pair of adjacent spool and cylinder flanges.
4. forming a tongue and groove interconnecting means between the external surface of at least one of the cylinders and the internal surface of the cylindrical housing for reducing rotation of the compressible telescopic hydraulic fluid conduit when torque is imposed thereon from the turbodrill means during drilling.

BRIEF DESCRIPTION OF THE DRAWINGS

The drawings diagrammatically illustrate by way of example, not by way of limitation, a few forms or mechanisms for carrying out the methods of the invention wherein like reference numerals have been employed to indicate similar parts in the several views in which:

FIG. 1 is a schematic vertical cross-sectional view of the transverse drilling mechanism;

FIG. 2 is a schematic horizontal sectional view taken at 2—2 on FIG. 1;

FIG. 3 is a schematic enlarged vertical sectional view taken at 3—3 on FIG. 1 with the springs removed showing the utilization of rubber-like O-rings;

A RIGHT ANGLED DRILLING MECHANISM

Figure 5:
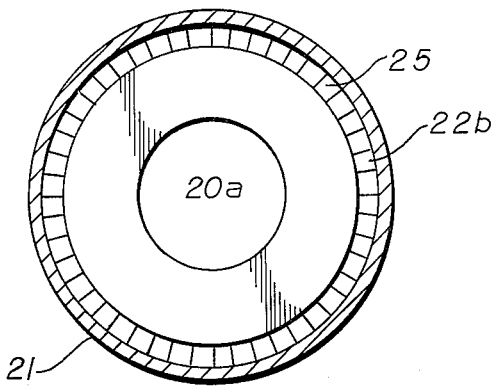
FIG. 5 is a schematic top view of the mechanism of FIG. 4.

While the following described mechanism will perform the above methods, obviously other devices will carry out the above methods, and other methods may be performed by these mechanisms.

FIG. 1 illustrates a transverse drilling mechanism comprising primarily an elongated cylindrical housing 10 enclosing a compressible and telescopic hydraulic fluid conduit 11, both for supplying and guiding a conventional turbodrill 12 for drilling transversely of the vertical well 13.

The housing 10, FIG. 1, comprises a long vertical cylinder having an open top (not shown) with a supporting cable, or the like, attached thereto for lowering and positioning the cylinder at the desired depth in the well 13. In FIG. 1, the housing 10 is illustrated resting on the packer 14 positioned previously at the desired depth in the well at the predetermined soil strata. The bottom of the cylindrical housing is closed with an arcuate guide 15 for guiding and directing the turbodrill 12 and following fluid conduit 11 straight out the transverse opening 16 formed on the side of the lower end of the elongated cylindrical housing 10. For limiting the movement of the fluid conduit 11, FIG. 1, in the cylindrical housing 10, upper and lower rings 17a and 17b are mounted internally thereof.

The compressible and telescopic hydraulic fluid conduit 11, FIG. 1, comprises a plurality of hollow spools 19 with external, outwardly extending flanges 20a and 20b on each end interconnected with cylinders 21, each cylinder having internal, inwardly extending flanges 22a, 22b at its ends for cupping over and retaining the spool external flanges to form a flexible elongated conduit. Coil springs 23, or the like, are inserted in the cylinders and compressed between the opposite flanged ends of each pair of adjacent spools. thus with the compression springs 23 providing a constant force on the spool ends, the conduit is biased to the extended straight position with the capability of telescoping when placed under a larger compressive force. Thus, instead of buckling or bending of the links as in the conventional flexible conduit when overloaded, the disclosed conduit merely telescopics and contracts, either for flexing around the required 90° turn when extending from transverse opening 16 or particularly, when placed under a heavy overload, as at the bottom of a long drill pipe string. In the overload conditions, heavy duty springs are utilized to accomodate a few tons of drill tubing string filled with hydraulic drilling fluid for operation of turbodrill 12. the drill tubing string 18 extends from a suitable source high pressure pump (not shown) on the surface down to the top of the fluid conduit 11 near the top of cylindrical housing 10, FIG. 1. Thus a compressible and telescopic hydraulic fuid conduit 11 is formed for providing a continuous supply of high pressure hydraulic drilling fluid for driving the turbodrill 12.

FIG. 2, a section at 2—2 on FIG. 1 illustrates a set of compression springs 23 set in recesses in the adjacent faces 20a of the external flanges of the spools facing each other inside each connecting cylinder 21. The springs 23 force the spool external flange 20a into frictional engagement with the cylinder internal flanges 22b at each end of each spool for preventing too much rotation, if any, from the resultant torque from the turbodrill 12 with its hydraulic fluid rotating impellers (not shown) wherein the fluid from the flexible and telescopic fluid conduit rotates the impellers for rotating the drill bits and is exhausted outside the conduit to return in the annulus formed between the conduit and the well.

FIG. 3, a view taken at 3—3 on FIG. 1 with the springs removed for clarity of disclosure, illustrates the utilization of rubber-like O-rings 24 to increase the friction between the external flange 20a of the spool 19 and the internal flange 22b of cylinder 21. Thus the friction in this modification would permit the fluid duct and drill pipe string to absorb more torque forces than the embodiment of FIG. 1.

Figure 4:
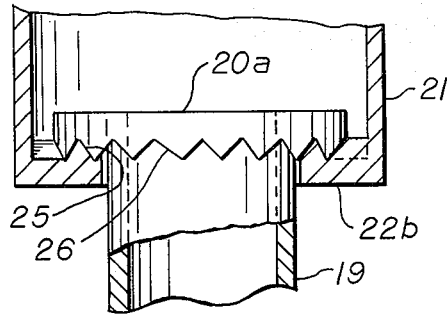
FIG. 4 is a schematic enlarged sectional view similar to FIG. 3 only serrations are utilized.

FIG. 4 is another view similar to FIG. 3, but of another modification with the springs removed for clarity of disclosure. Here the friction between the spool and the cylinder is increased greatly by matching serrations 25 on the cylinder internal flange 22b and the spool external flange 20a.

FIG. 5 is a top view of modified mechanism of FIG. 4, showing particularly the serrations 25 on the cylinder internal flange 22b.

Figure 7:
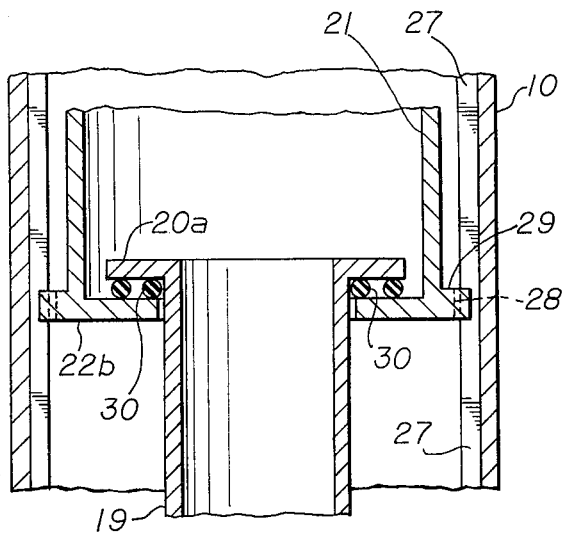
FIG. 7 is a schematic vertical sectional view taken at 7—7 on FIG. 6.
Figure 6:
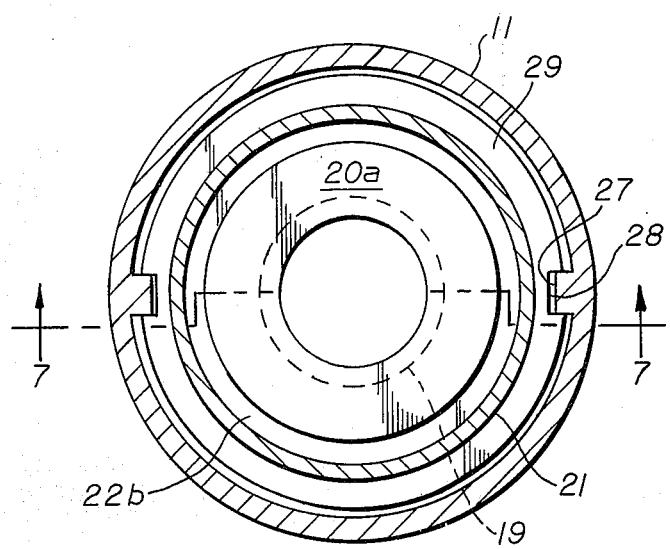
FIG. 6 is a schematic cross-sectional view of a modification of the transverse drilling mechanism of FIG. 1.

FIGS. 6 and 7 illustrate another modification of a transverse drilling mechanism in which a tongue is formed on the internal cylindrical wall of the cylindrical housing 11 and a matching groove 28 is formed in a ring 29 and which is formed integral with the outer periphery of the upper cylinder 21 for transfering torque forces from the turbodrill 12, FIG. 1, and flexible fluid conduit 11 with cylinders 21, FIGS. 6,7, to the cylindrical housing 10. Likewise, rubber O-rings 30 are utilized between cylinder internal flange 22b and spool external flange 20a for transmission of torque to the above described tongue-and-groove interconnection to the elongnated cylindrical housing 10.

In operation, the elongated cylindrical housing 10 is lowered until its transverse side opening 16 is at the depth and soil strata where the transverse well is desired to be drilled. Simultaneous with lowering of the housing, the drill tubing string connected to the top of the compressible telescopic hydraulic fluid conduit are lowered likewise with the housing. If so desired, the upper stops 17a may be removed for lowering of the fluid conduit 11 and drill tubing string 18 after lowering and positioning of the cylindrical housing 10. Then the drill pipe string 18 is lowered until the turbodrill 12 contacts the arcuate guide 15 and is curved to a right angle relative to the vertical well to penetrate or pass out through the transverse opening 16 to contact the side of the well. Then high pressure drill fluid is passed down from the drill tubing string 18, through the fluid conduit 11, and into the turbodrill 12 for rapid rotation thereof. Likewise forward pressure is applied to the turbodrill from through the fluid conduit 11 and the drill tubing string 18. As transverse drilling takes place, the compressible telescopic hydraulic fluid conduit 11 is lowered to push the turbodrill 12 straight out transversely of the elongated cylindrical housing 10 and the vertical well 13. A greater part of the fluid conduit may be extended from the transverse opening 16 before limited by lower stop 17b. When the transverse drilling is finished, the drill is withdrawn in the reverse order as it came down. It may be noted, that as overloads occur, the fluid conduit 11 may telescope and contract, and as the drilling proceeds, the springs continue to apply pressure on the turbodrill to continue smooth and efficient drilling.

Obviously other methods may be utilized for drilling transversely to a vertical well and for forming a transverse drilling mechanism like the embodiments of either FIGS. 3, 4, 6, or 7 than those listed above, depending on the particular information and degree of torque forces encountered.

Accordingly, it will be seen that at least one method for drilling transversely to a vertical well, at least one method for forming a transverse drilling mechanism, and at least five embodiments of a transverse drilling mechanism have been described which will operate in a manner which meets each of the objects set forth hereinbefore.

While only a few methods of the invention and a few mechanisms have been disclosed, it will be evident that various other methods and modifications are possible in the arrangement and construction of the disclosed methods and transverse drilling mechanisms without departing from the scope of the invention and it is accordingly desired to comprehend within the purview of this invention such methods and modifications as may be considered to fall within the scope of the appended claims.

We claim:

1. A method for drilling in a transverse direction from a vertical well with a turbodrill means comprising the steps of,
    a. lowering in the well to the desired depth an elongated cylindrical housing having a transverse opening adjacent the bottom thereof and an opening in the top thereof,
    b. positioning a compressible and telescopic hydraulic fluid conduit of axially aligned spools interconnected with a cylindrical spring biasing means in the elongated cylindrical housing,
    c. supplying a high pressure hydraulic drilling fluid through a drill pipe string to the top of the compressible and telescopic hydraulic fluid conduit in the elongated cylindrical housing for operating the turbodrill means at the bottom thereof,
    d. extending the lower end of the compressible and telescopic hydraulic fluid conduit with the turbodrill means on the end thereof down into the elongated cylindrical housing,
    e. compressing the cylindrical spring means between each pair of spools consecutively for moving the individual axially aligned spools of each pair closer together consecutively for turning the compressible and telescopic hydraulic fluid conduit from the vertical direction to the transverse direction, and
    f. spring biasing the axially aligned spools of each pair in said compressible and telescopic hydraulic fluid conduit away from each other by expanding said cylindrical spring biasing means between each pair for forcing the turbodrill means thereon out from the transverse opening in the elongated cylindrical housing for drilling transversely of the well at the desired depth under high compressive and torque loads.

2. A method for drilling in a transverse direction from a vertical well with a hydraulic drill means comprising the steps of,
   a. lowering in the well to the desired depth an elongated cylindrical housing having a transverse opening adjacent the closed bottom thereof, and an opening in the top thereof,
   b. extending a telescopic hydraulic fluid conduit of axially aligned spools interconnected with a cylindrical spring biasing means into the elongated cylindrical housing,
   c. extending the telescopic hydraulic fluid conduit with the hydraulic drill means on the lower end thereof downwardly through the elongated cylindrical housing,
   d. compressing the cylindrical spring means between each pair of spools consecutively for moving the individual axially aligned spools of each pair closer together consecutively for turning the compressible and telescopic hydraulic fluid conduit from the vertical direction to the transverse direction for moving out the transverse opening,
   e. spring biasing the axially aligned spools of each pair in the compressible and telescopic hydraulic fluid conduit away from each other by expanding the cylindrical spring biasing means between each pair for forcing the hydraulic drill means out from the transverse opening for drilling transversely of the well, and
   f. supplying a high pressure hydraulic drilling fluid through a drill pipe string to the telescopic hydraulic fluid conduit to the hydraulic drill means for drilling transversely of the vertical well at the desired depth under high compressive and torque loads.

3. A method for drilling in a horizontal direction transversely from a vertical well with a turbodrill on the end of a compressible telescopic hydraulic fluid conduit extendible into the top of an elongated cylindrical housing having a transverse opening adjacent the bottom thereof supplied with a tubing string from the surface comprising the method steps of,
   a. lowering the elongated cylindrical housing to the desired depth in the well with the compressible telescopic hydraulic fluid conduit and turbodrill thereon,
   b. applying a downward force to the compressible telescopic hydraulic fluid conduit for passing it through the elongated cylindrical housing and projecting the turbodrill from the elongated cylindrical housing transverse opening,
   c. simultaneously operating the turbodrill with hydraulic fluid from the compressible telescopic hydraulic fluid conduit and the drill pipe string for drilling transversely of vertical wall,
   d. compressing cylindrical spring means between a pair of spools when telescoping the compressible telescopic hydraulic fluid conduit as it turns at right angles in the elongated cylindrical housing, and
   e. spring biasing the spools of said pair away from each other by expanding the cylindrical spring biasing means between the pair of spools for forcing the hydraulic drill means transversely for drilling at right angles to the vertical well at the desired depth.

4. A method for forming and assembling a drilling mechanism for drilling at right angles to a vertical well comprising the steps of,
   a. closing the bottom of a cylindrical housing with an arcuate guide piece,
   b. forming an opening in the side of the cylindrical housing at the bottom in line transversely with the guide piece,
   c. forming a plurality of spools in axial alignment, the end of each spool having a radially outwardly extending flange,
   d. interconnecting the contiguous ends of adjacent spools with cylinders, the end of each cylinder having a radially inwardly extending flange for overlapping a spool radially outwardly extending flange,
   e. mounting a plurality of compression springs between the two opposite flanged spool ends in each cylinder for spring biasing the conduit of alternating cylinders and spools to a straight fully extended conduit for forming a compressible telescopic hydraulic fluid conduit, and
   f. connecting a high pressure hydraulic drilling fluid drill pipe string to the upper end of the compressible telescopic hydraulic fluid conduit and connecting a turbodrill means to the lower end of the compressible telescopic hydraulic fluid conduit so that the turbodrill means will extend transversely from the cylindrical housing side opening as guided by the arcuate guide piece.

5. A method as recited in claim 4 comprising the additional step of,
   a. forming a tongue and groove interconnecting means between the external surface of at least one of the cylinders and the internal surface of the cylindrical housing for reducing rotation of the compressible telescopic hydraulic fluid conduit when torque is imposed thereon from the turbodrill means during drilling.

6. A method as recited in claim 4 comprising the additional step of,
   a. forming a frictional surface between each pair of contiguous flange surfaces on the adjacent ends of each pair of adjacent spool and cylinder whereby the conduit will withstand high torque forces without buckling and bending resulting from the reaction of the turbodrill means and the high axial loads generated by the downward forces of the high pressure hydraulic drilling fluid drill pipe string whereby the arcuate guide piece causes the conduit to turn and drill at right angles to the well as the turbodrill means is extended further through the side opening in the cylindrical housing by downward movement of the high pressure hydraulic drilling fluid tubing string.

7. A method as recited in claim 6 comprising the additional step of,
   a. positioning at least one rubber-like ring between each pair of adjacent spool and cylinder flange surfaces.

8. A method as recited in claim 6 comprising the additional step of,
   a. forming serrations on the contiguous surfaces of each pair of adjacent spool and cylinder flanges.

9. A right angled drilling mechanism for drilling transversely to a vertical well at any desired depth in the well comprising, a. an elongated cylindrical housing means having an open upper end; a closed lower end, an opening in the side at the lower end transversely of the elongated cylindrical housing means,
b. a plurality of axially aligned spools with cylindrical spring biasing means interconnecting the adjacent ends of adjacent spools for forming a flexible spring biased telescopic fluid conduit means extending in said elongated cylindrical housing means,
c. a hydraulic fluid drill pipe means operable downwardly with high compressive loads for supplying high pressure drilling fluid, said flexible spring biased telescopic fluid conduit means hanging from the lower end of said hydraulic fluid drill pipe string means at the desired depth in the well for receiving high pressure drilling fluid,
d. turbodrill means in said elongated cylindrical housing means connected to a lower end of said flexible spring biased telescopic fluid conduit means for being driven by said high pressure drilling fluid, and
e. said hydraulic fluid drill pipe string means being moveable downwardly in said elongated cylindrical housing means to extend said turbodrill and flexible spring biased telescopic fluid conduit means at right angles from said elongated cylindrical housing means side opening for drilling at right angles to the well at the desired depth for a substantial distance under high compression loads.

10. A right angled drilling mechanism as recited in claim 9 wherein,
a. tongue and groove connecting means is formed between at least one of said cylindrical spring biasiang means and said elongated cylindrical housing means for reducing rotation of said flexible spring biased telescopic fluid conduit means when a torque is imposed thereon from said turbodrill means during drilling.

11. A right angled drilling mechanism as recited in claim 9 wherein,
a. each spool of said flexible spring biased telescopic fluid conduit means has an external flange extending outwardly on each end,
b. said cylindrical spring biasing means comprises a plurality of cylinders, each cylinder having an internal flange extending inwardly on each end,
c. each cylinder flange overlapping said flanged ends of two adjacent spools for limiting their extension, and
d. a plurality of compression springs in each cylinder compressed between the adjacent ends of each pair of adjacent spools for maintaining friction between said spool external flanges and said cylinder internal flanges for forming the flexible spring biased telescopic fluid conduit means.

12. A right angled drilling mechanism as recited in claim 11 wherein,
a. the top cylinder is secured to the lower end of said hydraulic fluid drill pipe string,
b. an outer radial flange positioned on one end of said top cylinder extends outwardly towards said elongated cylindrical housing, and
c. an inwardly extending flange on the upper end of said elongated cylindrical housing contacts said outer radial flange when said flexible spring biased telescopic fluid conduit means is pulled back into said elongated cylindrical housing means for raising said drilling mechanism to the surface.

13. A right angled drilling mechanism as recited in claim 11 wherein,
a. the top cylinder is secured to the lower end of said hydraulic fluid drill pipe string,
b. an outer radial flange positioned on one end of said top cylinder extends outwardly towards said elongated cylindrical housing, and
c. an inwardly extending flange on the lower end of said elongated cylindrical housing means contacts said outer radial flange when said turbodrill means and said flexible spring biased telescopic fluid conduit means are extended transversely of the well for limiting outward transverse movement of said flexible spring biased telescopic fluid conduit means from said elongated cylindrical housing means transverse opening.

14. A right angled drilling mechanism as recited in claim 11 wherein,
a. rubber-like rings are mounted between said spool external flanges and said cylinder internal flanges for increasing the friction therebetween.

15. A right angled drilling mechanism as recited in claim 11 wherein,
a. serrations are formed on the contiguous surfaces of said spool external flanges and said cylinder internal flanges for increasing the friction therebetween.

* * * * *